United States Patent [19]
Yamaguchi

[11] Patent Number: 6,144,184
[45] Date of Patent: *Nov. 7, 2000

[54] MOTOR CONTROLLING METHOD AND APPARATUS

[75] Inventor: Hiroshi Yamaguchi, Nagoya, Japan

[73] Assignee: Brother Kogyo Kabushiki Kaisha, Nagoya, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/120,795

[22] Filed: Jul. 23, 1998

[30] Foreign Application Priority Data

| Aug. 9, 1997 | [JP] | Japan | 9-227579 |
| Aug. 9, 1997 | [JP] | Japan | 9-227580 |
| Aug. 9, 1997 | [JP] | Japan | 9-227581 |

[51] Int. Cl.⁷ .................................................. H02P 8/00
[52] U.S. Cl. ................................. 318/696; 318/254
[58] Field of Search ..................... 318/254, 696, 318/685

[56] References Cited

U.S. PATENT DOCUMENTS

| 4,677,359 | 6/1987 | Enami et al. | 318/696 |
| 4,691,154 | 9/1987 | Sato et al. | 318/696 |
| 4,701,687 | 10/1987 | Yoshimoto | 318/696 |
| 4,717,866 | 1/1988 | Gray | 318/696 |
| 5,001,410 | 3/1991 | Ono | 318/696 |
| 5,008,607 | 4/1991 | Ono et al. | 318/696 |
| 5,034,674 | 7/1991 | Sato | 318/696 |
| 5,041,773 | 8/1991 | Takahashi | 318/696 |
| 5,062,006 | 10/1991 | Miura . | |
| 5,225,914 | 7/1993 | Saito | 358/404 |
| 5,231,343 | 7/1993 | Nakamura | 318/696 |
| 5,264,771 | 11/1993 | Kawauchi | 318/696 |
| 5,283,510 | 2/1994 | Tamaki et al. | 318/696 |
| 5,367,239 | 11/1994 | Matsushita et al. | 318/685 |
| 5,416,395 | 5/1995 | Hiramatsu et al. | 318/81 |
| 5,446,517 | 8/1995 | Murakami et al. | 396/133 |
| 5,491,397 | 2/1996 | Hirakawa | 318/696 |
| 5,574,351 | 11/1996 | Jacobson et al. | 318/696 |
| 5,583,620 | 12/1996 | Miyamoto | 318/685 |
| 5,811,953 | 9/1998 | Watanabe et al. | 318/685 |
| 5,825,151 | 10/1998 | Ikawa et al. | 318/685 |
| 5,844,394 | 12/1998 | Mushika et al. | 318/696 |
| 5,894,209 | 4/1999 | Takagi et al. | 318/696 |
| 5,963,006 | 10/1999 | Otani | 318/696 |

FOREIGN PATENT DOCUMENTS

| 8-11379 | 1/1996 | Japan . |
| 8-275591 | 10/1996 | Japan . |

*Primary Examiner*—Brian Sircus
*Attorney, Agent, or Firm*—Oliff & Berridge, PLC

[57] ABSTRACT

In a sheet conveying stepping motor control method and apparatus, a microcomputer controls a stepping motor for intermittently conveying a sheet in different manners for high-speed, low-to-intermediate speed and fractional conveyance, using a motor driver capable of selecting a motor excitation current from values of high, intermediate and low levels. For the high-speed conveyance, the stepping motor is driven by two-two phase excitation with step-up and step-down control. The excitation current is set to the intermediate level during the initial step, and then to the high level during the later steps, and then to the low level during the final step. For the low-to-intermediate speed conveyance, the excitation is performed by self-start driving. One-two phase excitation is performed during the initial step and the final step, and two-two phase excitation is performed therebetween. The excitation current is set to the high level during the one-phase excitation in one-two phase excitation, and to the intermediate level during the two-phase excitation. The excitation period in one-two phase excitation is longer than that in two-two phase excitation. For the fractional conveyance, the motor is driven by one-two phase excitation. The excitation current is increased in three steps during the initial one-phase excitation period, and in two steps during the later periods. During the final two-phase excitation period, the excitation current is reduced from the intermediate to low levels. The excitation period by the low current during the final two-phase excitation is relatively long.

24 Claims, 14 Drawing Sheets

Fig.8A

| NUMBER OF STEPS | — | 1 | 2 | 3 | 4 | 5 | ... | N-4 | N-3 | N-2 | N-1 | N | — |
|---|---|---|---|---|---|---|---|---|---|---|---|---|---|
| EXCITATION PERIOD | PRE-EXCITATION 10.0 | 4.0 | 2.6 | 2.4 | 2.3 | 2.08 | | 2.08 | 2.3 | 2.7 | 3.5 | 5.8 | POST-EXCITATION 10.0 |
| EXCITATION CURRENT | 33 | 100 | 70 | 100 | 100 | 100 | 100 | | 100 | 100 | 100 | 100 | 33 | 100 |

Fig.8B  PRIOR ART

| NUMBER OF STEPS | — | 1 | 2 | 3 | 4 | 5 | ... | N-4 | N-3 | N-2 | N-1 | N | — |
|---|---|---|---|---|---|---|---|---|---|---|---|---|---|
| EXCITATION PERIOD | PRE-EXCITATION 10.0 | 5.8 | 3.5 | 2.7 | 2.3 | 2.08 | | 2.08 | 2.3 | 2.7 | 3.5 | 5.8 | POST-EXCITATION 10.0 |
| EXCITATION CURRENT | 33 | 100 | 100 | 100 | 100 | 100 | | 100 | 100 | 100 | 100 | 100 | 33 | 100 |

Fig.10A

| NUMBER OF STEPS | — | 0.5 | 1 | 2 | 3 | 4 | 5 | ... | N-4 | N-3 | N-2 | N-1 | N-0.5 | N | — |
|---|---|---|---|---|---|---|---|---|---|---|---|---|---|---|---|
| EXCITATION PERIOD | PRE-EXCITATION 10.0 | 2.4 | 3.5 | 2.63 | 2.63 | 2.63 | 2.63 | | 2.63 | 2.63 | 2.63 | 2.63 | 2.8 | 5.0 | POST-EXCITATION 10.0 |
| EXCITATION CURRENT | 33 | 100 | 70 | 100 | 100 | 100 | 100 | | 100 | 100 | 100 | 100 | 100 | 70 | 100 | 33 |
| A-PHASE | | | | | | | | | | | | | | | | |
| B-PHASE | | | | | | | | | | | | | | | | |
| C-PHASE | | | | | | | | | | | | | | | | |
| D-PHASE | | | | | | | | | | | | | | | | |

Fig.10B   PRIOR ART

| NUMBER OF STEPS | — | 1 | 2 | 3 | 4 | 5 | ... | N-4 | N-3 | N-2 | N-1 | N | — |
|---|---|---|---|---|---|---|---|---|---|---|---|---|---|
| EXCITATION PERIOD | PRE-EXCITATION 10.0 | 2.63 | 2.63 | 2.63 | 2.63 | 2.63 | | 2.63 | 2.63 | 2.63 | 2.63 | 2.63 | POST-EXCITATION 10.0 |
| EXCITATION CURRENT | 33 | 100 | 100 | 100 | 100 | 100 | | 100 | 100 | 100 | 100 | 100 | 33 |
| A-PHASE | | | | | | | | | | | | | |
| B-PHASE | | | | | | | | | | | | | |
| C-PHASE | | | | | | | | | | | | | |
| D-PHASE | | | | | | | | | | | | | |

Fig.12A

| NUMBER OF STEPS | — | | | | | | | | | | | |
|---|---|---|---|---|---|---|---|---|---|---|---|---|
| EXCITATION PERIOD | PRE-EXCITATION 10.0 | | 0.5 | | 1 | | 1.5 | | 2 | 3.5 | POST-EXCITATION 10 | — |
| EXCITATION CURRENT | 33 | 100 | 1.6 33 | 1.6 70 | 1.6 100 | 1.6 33 | 1.6 70 | 1.6 100 | 1.6 70 | 1.6 70 | 100 | 33 |
| A-PHASE | | | | | | | | | | | | |
| B-PHASE | | | | | | | | | | | | |
| C-PHASE | | | | | | | | | | | | |
| D-PHASE | | | | | | | | | | | | |

Fig.12B  PRIOR ART

| NUMBER OF STEPS | — | 1 | 2 | POST-EXCITATION 10 | — |
|---|---|---|---|---|---|
| EXCITATION PERIOD | PRE-EXCITATION 10.0 | 2.63 | 2.63 | | |
| EXCITATION CURRENT | 33 | 100 | 100 | 100 | 33 |
| A-PHASE | | | | | |
| B-PHASE | | | | | |
| C-PHASE | | | | | |
| D-PHASE | | | | | |

Fig.13A
Fig.13B
Fig.13C
PRIOR ART
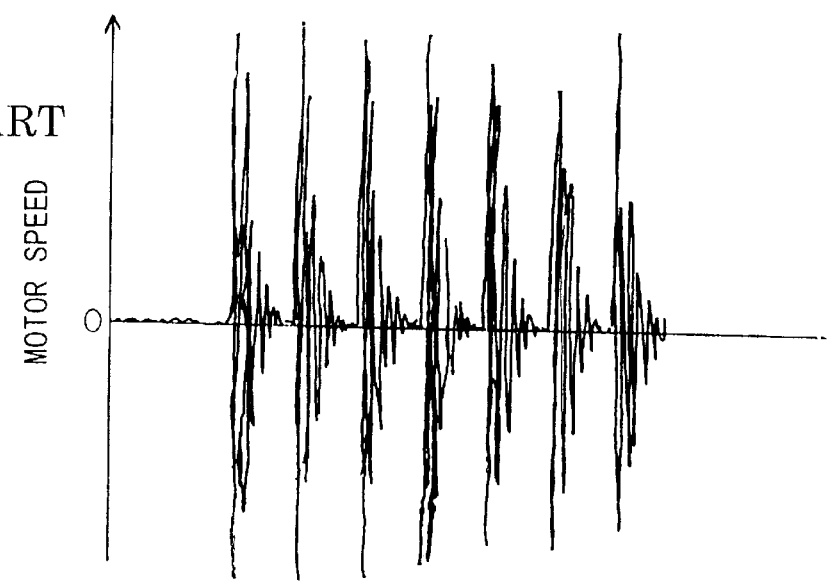
Fig.13D
PRIOR ART
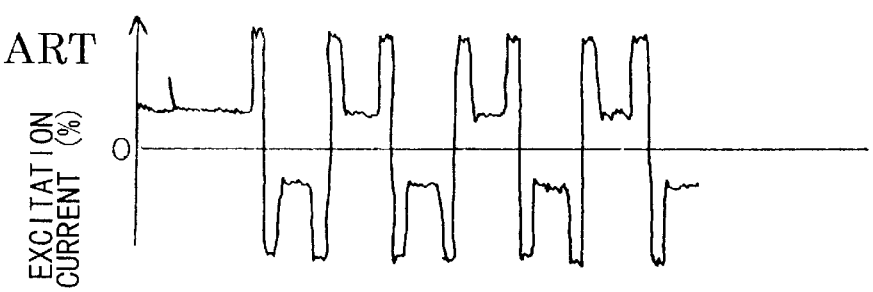

MOTOR CONTROLLING METHOD AND APPARATUS

BACKGROUND OF THE INVENTION

1. Field of Invention

The present invention relates to a sheet conveying stepping motor control method and apparatus for use in printers, facsimiles and the like.

2. Description of Related Art

There are known sheet conveying mechanisms for electronic appliances such as printers, facsimiles and the like, wherein a sheet conveying roller is driven by a stepping motor. In such electronic appliances, intermittent sheet conveyance is performed at various conveying speeds and amounts. For example, in a low-to-intermediate speed conveyance, the stepping motor is operated at a low-to-intermediate speed by self-start driving in order to avoid the motor operating out-of-step. In a high-speed conveyance, the stepping motor is operated at a high speed by performing step-up and step-down control. Furthermore, in a fractional conveyance, the stepping motor is operated a very small rotational angle at a time. In such various methods of intermittent conveyance according to the conventional art, the stepping motor is driven in a two-two phase excitation (magnetization) mode through constant-current control.

However, in the high-speed sheet conveyance performed in the two-two phase excitation mode by constant-current control, the operating speed of the motor considerably fluctuates at the motor starting and stopping points, thereby giving rise to a noise problem. Furthermore, such motor revolution speed fluctuation results in variations in the amount of conveyance, thereby degrading print quality and the like.

Furthermore, if the low-to-intermediate sheet conveyance in the two-two phase excitation mode is performed by self-start driving, the operating speed of the motor considerably fluctuates at the start and stop of the motor operation, thereby giving rise to a noise problem. Furthermore, due to such motor revolution speed fluctuation, the amount of conveyance varies.

In the fractional sheet conveyance performed in the two-two phase excitation mode, the stepping motor is frequently started and stopped, thereby producing vibrations that result in noise.

SUMMARY OF THE INVENTION

Accordingly, it is an aspect of the invention to provide a sheet conveying stepping motor control method and apparatus wherein the motor revolution speed fluctuation during high-speed intermittent sheet conveyance can be reduced.

It is another aspect of the invention to provide a sheet conveying stepping motor control method and apparatus wherein during the intermittent sheet conveyance by self-start driving, the motor revolution speed fluctuation can be reduced.

It is still another object of the invention to provide a sheet conveying stepping motor control method and apparatus that are capable of reducing noises during the fractional sheet conveyance.

The invention provides a sheet conveying stepping motor control method and apparatus for intermittently conveying a sheet at a high speed, wherein a sheet conveying roller is driven at a high speed by starting a stepping motor for driving the sheet conveying roller, in a two-two phase excitation mode under a step-up control, and after the stepping motor is driven a predetermined number of steps, the sheet conveying roller is stopped by stopping the stepping motor under a step-down control. An excitation current in an initial step during the step-up control is set to a first current value that is less than a current value in the other steps during the step-up control. The excitation current in a final step during the step-down control is set to a second current value that is less than a current value in the other steps during the step-down control.

The sheet conveying stepping motor control method and apparatus is able to reduce the motor starting torque and therefore start the stepping motor with smooth revolutions by setting the excitation current in the initial step during the step-up control to the first current value that is less than the excitation current in the following steps. Furthermore, the method and apparatus is also able to reduce the motor driving torque in the final step and therefore smoothly stop the motor by setting the excitation current in the final step during the step-down control to the second current value that is less than the excitation current in the other steps during the step-down control. The first current value may be greater than the second current value.

The invention also provides a sheet conveying stepping motor control method and apparatus for intermittently conveying a sheet at a high speed, wherein a sheet conveying roller is driven at a high speed by starting a stepping motor for driving the sheet conveying roller, in a two-two phase excitation mode under a step-up control, and after the stepping motor is driven a predetermined number of steps, the sheet conveying roller is stopped by stopping the stepping motor under a step-down control. A motor driver for the stepping motor is employed which makes it possible to select an excitation current from at least three current values of a high level, an intermediate level and a low level. Excitation current in an initial step during the step-up control is set to the current value of the intermediate level, and the excitation current in a final step during the step-down control is set to the current value of the low level, and the excitation current in each of the steps other than the initial step during the step-up control and the final step during the step-down control is set to the current value of the high level.

Therefore, this control method and apparatus performs constant-current control in the two-two phase excitation mode using the high level current value in each step except the initial and final steps, thereby achieving high-speed sheet conveyance substantially throughout the operation of the stepping motor. However, since the initial step is controlled by the intermediate level current value, the starting torque in the initial step is reduced, so that the revolution speed fluctuation at the start of the stepping motor can be reduced, as described above. Furthermore, since the final step is performed by the low level current value, the driving torque immediately before the motor is stopped is reduced, so that the motor revolution can be smoothly stopped.

In the sheet conveying stepping motor control method and apparatus as described above, the motor driver may be a motor driver wherein the current value of the intermediate level is set to about $2/3$ of the current value of the high level, and the current value of the low level is set to about $1/3$ of the current value of the high level.

The invention also provides a sheet conveying method and apparatus including a sheet conveying roller, a stepping motor for driving the sheet conveying roller, a step-up control device for setting excitation current in an initial step at a start of the stepping motor to a first current value and setting the excitation current in at least one step subsequent to the initial step to a second current value that is greater than the first current value, and for changing excitation phases of the stepping motor while substantially gradually reducing an excitation period in a two-two phase excitation mode, a constant-speed drive control device for, after a period of control by the step-up control device, changing the excitation phases of the stepping motor in a constant cycle in the two-two phase excitation mode using the second current value as the excitation current, and a step-down control device for, after a period of control by the constant-speed drive control device, maintaining the second current value as the excitation current until a step preceding a final step immediately before the stepping motor stops and setting the excitation current in the final step immediately before the motor stops to a third current value that is less than the first current value, and changing the excitation phases of the stepping motor while substantially gradually increasing the excitation period in the two-two phase excitation mode.

The sheet conveying method and apparatus is able to reduce the motor starting torque and therefore smoothly start the stepping motor by performing the step-up control in the two-two phase excitation mode, wherein the excitation current in the initial step is set to the relatively low current value, that is, the first current value, and the excitation current in the subsequent and later steps is set to the relatively high current value, that is, the second current value. After the step-up control, the stepping motor is operated by performing two-two phase excitation at a constant cycle using the second current value. Then, during the step-down control, the driving torque, immediately before the stepping motor is stopped, is reduced by setting the excitation current in the final step to the third current value, which is less than the first current value. Therefore, vibration at the time the motor stops can be substantially prevented. This sheet conveying method and apparatus allows realization of the sheet conveying stepping motor control method and apparatus described above.

The invention also provides a sheet conveying method and apparatus including a sheet conveying roller, a stepping motor for driving the sheet conveying roller, a motor driver making it possible to select an excitation current from at least three current values of a high level, an intermediate level and a low level, a step-up control device for setting excitation current selectable in the motor driver to the current value of the intermediate value for an initial step and setting the excitation current to the current value of the high level for at least one step subsequent to the initial step, and for changing excitation phases of the stepping motor while substantially gradually reducing an excitation period in a two-two phase excitation mode, a constant-speed drive control device for, after a period of control by the step-up control device, maintaining the excitation current selectable in the motor driver at the current value of the high level and changing the excitation phases of the stepping motor in a constant cycle in the two-two phase excitation mode, and a step-down control device for, after a period of control by the constant-speed drive control device, maintaining the excitation current selectable in the motor driver at the high level current value until a step preceding a final step immediately before the stepping motor stops and setting the excitation current in the final step immediately before the motor stops to the low level current value, and changing the excitation phases of the stepping motor while substantially gradually increasing the excitation period in the two-two phase excitation mode.

This sheet conveying method and apparatus uses the intermediate level current value as the excitation current in the initial step immediately after the stepping motor starts, uses the high level current value as the excitation current in the later steps, and uses the low level current value as the excitation current in the final step immediately before the stepping motor is stopped. Therefore, the motor starting torque during the step-up control and the driving torque during the step-down control immediately before the stepping motor stops are reduced, and high-speed sheet conveyance is performed using the high-level excitation current throughout the motor operation except the initial and final steps.

In the sheet conveying method and apparatus described above, the motor driver may be a motor driver wherein the current value of the intermediate level is set to about $2/3$ of the high level current value, and the low level current value is set to about $1/3$ of the high level current value.

The invention also provides a sheet conveying method and apparatus including a sheet conveying roller, a stepping motor for driving the sheet conveying roller, and an intermittent conveyance process selector device for selecting an intermittent sheet conveyance process by the stepping motor from a high-speed sheet conveyance control process wherein a step-up control and a step-down control are performed, a low-to-intermediate speed sheet conveyance control process by self-start driving, and a fractional sheet conveyance control process wherein intermittent conveyance for a relatively small step angle is repeated. A high-speed conveyance control device is provided such that when the high-speed sheet conveyance control process is selected by the intermittent conveyance process selector device, setting excitation current in an initial step during the step-up control in a two-two phase excitation mode to a first current value that is less than the excitation current in at least one other step during the step-up control, and setting the excitation current in a final step during the step-down control to a second current value that is less than the excitation current in at least one other step during the step-down control. A low-to-intermediate speed conveyance control device is provided for, when the low-to-intermediate speed sheet conveyance control process is selected by the intermittent conveyance process selector device, setting a one-two phase excitation mode in an step immediately after the stepping motor starts and a step immediately before the stepping motor stops and setting the two-two phase excitation mode in the steps between the step immediately after the motor starts and the step immediately before the motor stops. A fractional conveyance control device is provided for, when the fractional sheet conveyance control process is selected by the intermittent conveyance process selector device, setting the one-two phase excitation mode in the step immediately after the stepping motor starts and the step immediately before the stepping motor stops, and setting the excitation current during a one-phase excitation period in the step of the one-two phase excitation mode immediately after the motor starts to a relatively small current value and then substantially gradually increasing the current value of the excitation current, and substantially gradually decreasing the current value of the excitation current during a two-phase excitation period in the step of the one-two phase excitation mode immediately before the motor stops.

The intermittent conveyance process selector device may be formed by a microcomputer that executes an instruction to select one of high-speed sheet conveyance and low-to-intermediate speed sheet conveyance, corresponding to a normal print mode and a fine print mode, respectively, in accordance with a selecting operation performed on an operating panel provided on the method and apparatus body, or an instruction to perform fractional sheet conveyance that is automatically output when a print failure is detected on the basis of a check mark.

Therefore, this sheet conveying method and apparatus reduces the motor speed fluctuation and therefore reduces noise and, furthermore, improves the precision in stopping a sheet.

The invention also provides a sheet conveying stepping motor control method and apparatus for intermittently conveying a sheet by driving a stepping motor for driving a sheet conveying roller, a predetermined number of steps and then stopping the stepping motor, in a two-two phase excitation mode by self-start driving. In the control method, excitation is performed in a one-two phase excitation mode instead of the two-two phase excitation mode, during one step of the predetermined number of steps that occur immediately after the stepping motor starts and during one step of the predetermined number of steps that occur immediately before the stepping motor stops.

In this control method of the invention, immediately after the motor starts and immediately before the motor stops, a motor revolution angular change, as achieved conventionally in one step in the two-two phase excitation mode, is achieved in two steps in the one-two phase excitation mode. Therefore, the rise of the motor speed immediately after the motor starts becomes smooth, and the reduction of the motor speed immediately before the motor stops also becomes smooth. The motor speed fluctuation can thus be reduced.

In the sheet conveying stepping motor control method and apparatus described above, the excitation current during the two-phase excitation in the one-two phase excitation mode may be less than the excitation current during the one-phase excitation in the one-two phase excitation mode. It is also possible to employ a motor driver that makes it possible to select an excitation current from at least two current values of a high level and an intermediate level. Using this motor driver, the excitation current during the one-phase excitation in the one-two phase excitation is set to the current value of the high level, and the excitation current during the two-phase excitation in the one-two phase excitation is set to the current value of the intermediate level, and the excitation current during the two-two phase excitation is set to the current value of the high level.

By setting the excitation current during the two-phase excitation in the one-two phase excitation to a value less than the excitation current during the one-phase excitation in the one-two phase excitation, the driving torque change is reduced. The reduction of the driving torque change, and the reduction of the revolution angular change achieved by performing the one-two phase excitation mode, further reduce the motor speed fluctuation.

In this control method, the step period in the one-two phase excitation mode may be longer than the step period in the two-two phase excitation mode. Therefore, the period at the motor start from a stopped state during which the one-two phase excitation mode is performed (the time required to achieve an angular change corresponding to that achieved in a step in the two-two phase excitation mode) becomes longer than the time of a normal step in the two-two phase excitation mode. Correspondingly, the rise of the motor revolution speed becomes smoother. Substantially the same advantage is achieved in conjunction with speed reduction immediately before the stepping motor is stopped. The excitation period may be determined on the basis of experimental results or the like.

The invention also provides a sheet conveying method and apparatus including a sheet conveying roller, a stepping motor for driving the sheet conveying roller, and an intermittent conveyance control device for intermittently conveying a sheet by driving the stepping motor a predetermined number of steps and then stopping the stepping motor, in a two-two phase excitation mode by self-start driving. By the intermittent conveyance control device, excitation of the stepping motor is performed in a one-two phase excitation mode instead of the two-two phase excitation mode, during one step of the predetermined number of steps that occur immediately after the stepping motor starts and during one step of the predetermined number of steps that occur immediately before the stepping motor stops.

The sheet conveying method and apparatus may further include a motor driver capable of selecting an excitation current for the stepping motor from at least two current values of a high level and an intermediate level. The intermittent conveyance control device instructs the motor driver to select the current value of the high level as the excitation current during the one-phase excitation in the one-two phase excitation, and the current value of the intermediate level as the excitation current during the two-phase excitation in the one-two phase excitation, and the current value of the high level as the excitation current during the two-two phase excitation.

In the sheet conveying method and apparatus as described above, the intermittent conveyance control device may set the step period in the one-two phase excitation mode to a period that is longer than the step period in the two-two phase excitation mode.

The invention also provides a sheet conveying stepping motor control method and apparatus for intermittently conveying a sheet a predetermined amount at a time by intermittently driving a stepping motor for driving a sheet conveying roller, a predetermined rotational angle at a time, wherein the stepping motor is started in a one-two phase excitation mode, and during a one-phase excitation period immediately after a start of the stepping motor, the excitation current is set to a relatively low current value, and the current value of the excitation current is then substantially gradually increased.

In this control method, the motor revolution angular change immediately after the motor starts is reduced by starting the stepping motor in the one-two phase excitation mode. Furthermore, by initially setting the excitation current during the one-phase excitation immediately after the motor starts or the initial step and then substantially gradually increasing the excitation current, the torque fluctuation immediately after the motor starts is reduced. Therefore, the motor speed change and the torque fluctuation immediately after the motor starts, which can cause significant vibration, can be reduced. Consequently, vibration can be considerably reduced.

In the sheet conveying stepping motor control method and apparatus, the one-two phase excitation mode may be employed to stop the stepping motor, and the excitation current may be substantially gradually reduced during the two-phase excitation period immediately before the motor stops.

Therefore, the motor revolution angle change immediately before the motor stops is reduced. Furthermore, since the motor torque is substantially gradually reduced before the motor is stopped, vibration at the time the motor stops can also be reduced.

The invention also provides a sheet conveying stepping motor control method and apparatus for intermittently conveying a sheet a predetermined amount at a time by intermittently driving a stepping motor that drives a sheet conveying roller, a predetermined rotational angle at a time, wherein the stepping motor is driven in a one-two phase excitation mode from the motor start to stop, and wherein the current value of excitation current is substantially gradually reduced during a two-phase excitation period immediately before the motor stops, and during the other excitation periods, the excitation current is initially set to a relatively low current value, and then substantially gradually increased.

In this control method, the angular change in each step throughout motor operation from the motor start to the motor stop becomes half, in comparison with each step in the two-two phase excitation. Furthermore, the torque is substantially gradually increased during a period immediately after the motor starts, and the torque is substantially gradually reduced during a period immediately before the motor stops. Therefore, vibration at the motor start and stop operation is reduced. In addition, the torque is also substantially gradually increased in each step during a period other than the period immediately after the motor starts and the period immediately before the motor stops. Therefore, the motor revolution angle change in each step becomes gentle, thereby further reducing vibration.

In the sheet conveying stepping motor control method and apparatus as described above, the maximum current during the two-phase excitation may be less than the maximum current during the one-phase excitation. More specifically, the stepping motor may be a stepping motor that makes it possible to select at least three current values of a high level, an intermediate level and a low level. Using this motor driver, the excitation current during the one-phase excitation is increased in three steps from the low level, the intermediate level to the high level, or in two steps from the intermediate level to the high level. During the two-phase excitation except a two-phase excitation period immediately before the motor stops, the excitation current is increased in two steps from the low level to the intermediate level. During the two-phase excitation period immediately before the motor stops, the excitation current is reduced in two steps from the intermediate level to the low level.

The excitation current is increased stepwise during each step except the step immediately before the motor stops, for the same reason as described above. The maximum level during the two-phase excitation is reduced to the intermediate level for the following reason. That is, since the motor torque tends to be greater during the two-phase excitation than during the one-phase excitation, it is desirable to set the maximum current value during the two-phase excitation to a value less than the maximum current during the one-phase excitation, in order to further reduce the torque fluctuation throughout the motor operation.

The invention also provides a sheet conveying method and apparatus including a sheet conveying roller, a stepping motor for driving the sheet conveying roller, a motor driver that makes it possible to select an excitation current from at least three current values of a high level, an intermediate level and a low level, and a start control device for starting the stepping motor in a one-two phase excitation mode and for selecting current values in the motor driver so that the excitation current is increased stepwise from the low level, the intermediate level to the high level during a one-phase excitation period immediately after the start of the motor operation.

Therefore, in the sheet conveying method and apparatus, the step angle immediately after the motor starts is reduced by performing the one-two phase excitation during the motor start. Furthermore, the starting torque can be smoothly increased by increasing the excitation current stepwise from the low level, the intermediate level to the high level during the initial one-phase excitation period. Therefore, a sharp motor speed change and sharp torque fluctuation immediately after the motor starts can be substantially prevented, and noise caused by vibration can be reduced.

The sheet conveying method and apparatus may further include a stop control device for stopping the stepping motor by performing the one-two phase excitation and for selecting current values in the motor driver so that the excitation current is reduced stepwise from the intermediate level to the low level during a two-phase excitation period immediately before the motor operation stops.

Therefore, in the sheet conveying method and apparatus, the motor revolution angular change immediately before the motor stops is reduced by performing the one-two phase excitation mode during the motor stop. Furthermore, by reducing the excitation current stepwise from the intermediate level to the low level during the two-phase excitation period immediately before the motor stops, the driving torque immediately before the motor stops is substantially gradually reduced, so that the motor speed change and torque fluctuation at the time the motor stops can be considerably reduced and, therefore, vibration can also be considerably reduced.

BRIEF DESCRIPTION OF THE DRAWINGS

A preferred embodiment of the present invention will be described in detail with reference to the following figures wherein:

FIG. 8A is a timing chart of a high-speed sheet conveyance control method according to the embodiment;

FIG. 8B is a timing chart of a conventional high-speed sheet conveyance control method, for the purpose of comparison;

FIG. 10A is a timing chart of a low-to-intermediate speed sheet conveyance control method according to the embodiment;

FIG. 10B is a timing chart of a conventional low-to-intermediate speed sheet conveyance method, for the purpose of comparison;

FIG. 12A is a timing chart of a fractional sheet conveyance control method according to the embodiment;

FIG. 12B is a timing chart of a conventional fractional sheet conveyance method, for the purpose of comparison;

FIGS. 13A and 13B are graphs indicating changes of the motor speed and excitation current in the fractional sheet conveyance according to the embodiment;

FIGS. 13C and 13D are graphs indicating changes of the motor speed and excitation current in the conventional fractional sheet conveyance;

DETAILED DESCRIPTION OF PREFERRED EMBODIMENTS

A preferred embodiment of the invention will be described in detail hereinafter with reference to the accompanying drawings.

A multifunction method and apparatus according to the preferred embodiment of the invention will be described. The "multifunction apparatus" herein means an apparatus having many different functions, for example, a copier function, an answering phone function, a telephone function, a facsimile function, a scanner function, a printer function and the like. The multifunction apparatus herein may be equipped with all of these functions, or only some of them, or may further have functions other than those stated above. The invention may be applied not only to such a multifunction apparatus but also to a facsimile-dedicated apparatus, and the like.

Figure 1:
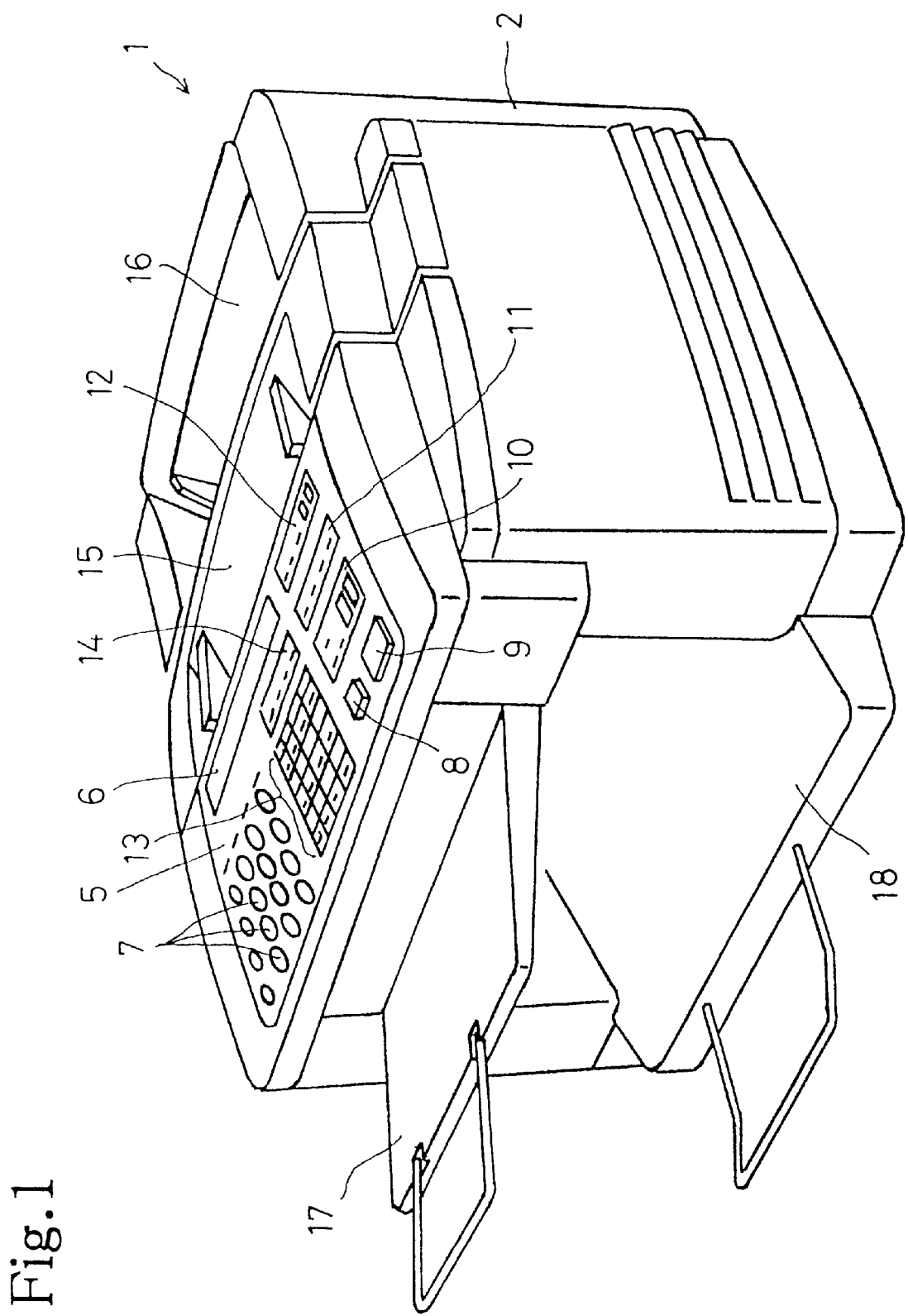
FIG. 1 is an external perspective view of a multifunction apparatus according to a preferred embodiment of the invention.

FIG. 1 is an external perspective view of the multifunction apparatus according to the embodiment. The multifunction apparatus 1 has an operating panel unit 5 disposed on a top surface of an apparatus body 2. A liquid crystal display 6 is disposed at a leftward rear position in the operating panel unit 5.

Arranged on the left side of the operating panel unit 5 are dial buttons 7 for inputting telephone numbers, and the like. The dial buttons 7 include "1" to "0" numerical buttons and, further, an asterisk "*" button, a sharp "#" button, and the like. Arranged on the right side of the operating panel unit 5 are a stop key 8 for stopping an operation, a start key 9 for starting an operation, a color copy key 10 for using the apparatus as a color copier, a color print key 11 for using the apparatus as a color printer, and an answering machine key 12 for using the apparatus as an answering machine, in that order from the front to the rear of the operating panel unit 5.

Disposed substantially at the center of the operating panel unit 5 are a one-touch dial key 13 for simplifying a dialing operation, and a facsimile key 14 for using the apparatus as a facsimile.

Provided rearward of the operating panel unit 5 is a document loading portion 15 for placing a stack of documents to be scanned. Provided rearward of the document loading portion 15 is a sheet feeder portion 16 for placing a stack of recording sheets on which recording will be performed.

Disposed forward of the operating panel unit 5 is a document stacker 17 for supporting a stack of documents that have been scanned. Disposed under the document stacker 17 is a recorded sheet stacker 18 for supporting a stack of recorded sheets.

Figure 2:
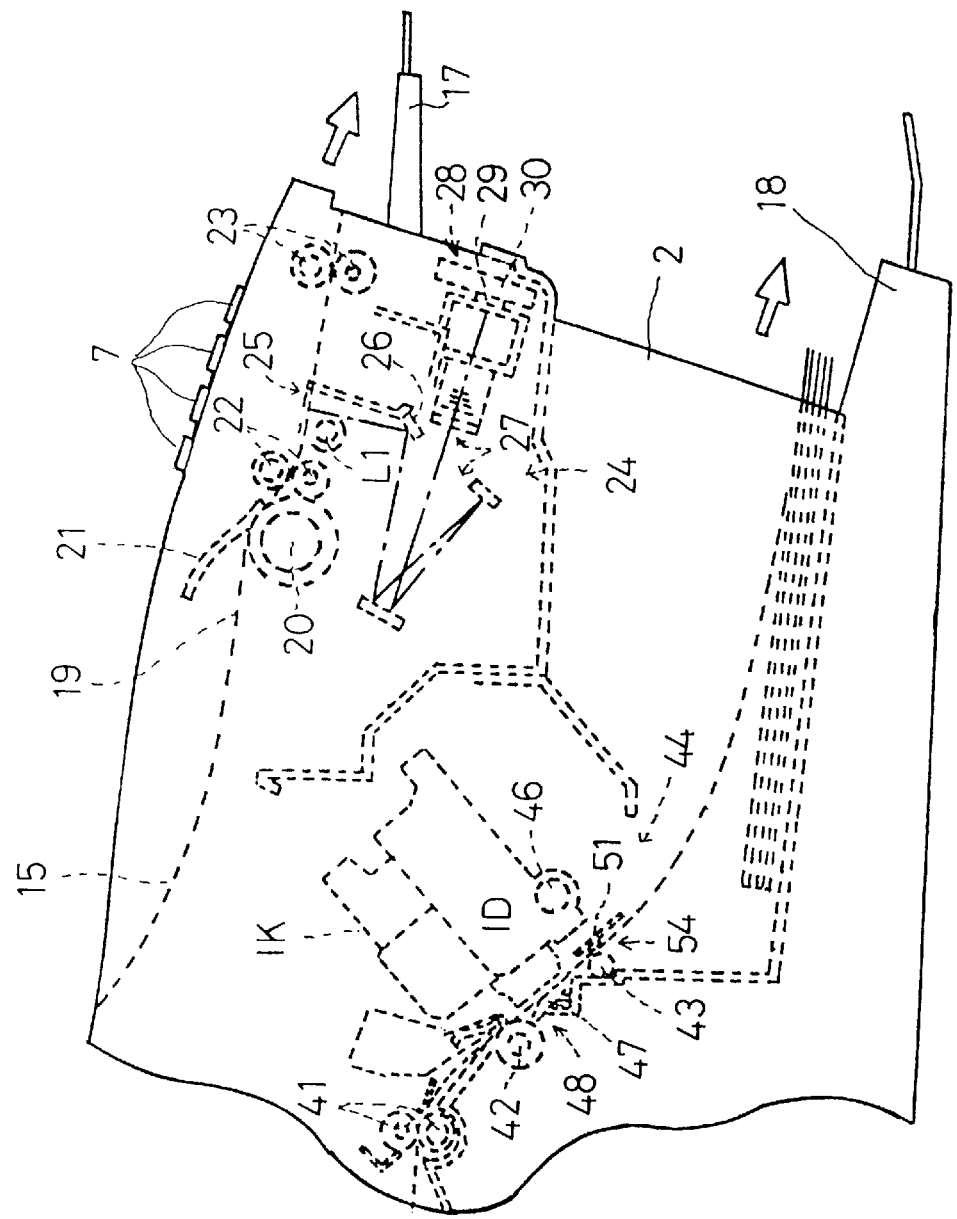
FIG. 2 is a side view of the multifunction apparatus shown in FIG. 1, illustrating internal portions thereof.

A document is conveyed from the document loading portion 15 to the document stacker 17 through the interior of the apparatus body 2 of the multifunction apparatus 1 through a guide path 19 located below the operating panel unit 5, as shown in FIG. 2. More specifically, a document separating roller 20 and a separator piece 21 facing and contacting the document separating roller 20 are disposed along the guide path 19 below the operating panel unit 5. Disposed downstream of the document separating roller 20 are a pair of upper and lower guide rollers 22. Disposed downstream of the upper and lower guide rollers 22 are another pair of upper and lower guide rollers 23. The upper and lower guide rollers 23 are disposed slightly upstream of the document stacker 17.

With this mechanism, a document is separated from a stack of documents placed in the document loading portion 15, by the document separating roller 20 and the separator piece 21. Subsequently, the document is conveyed downstream while the upper and lower guide rollers 22, 23 are applying tension to the document. While being conveyed downstream, the document is scanned by a scanner unit 24 disposed in a forward interior portion of the apparatus body 2.

A scanning position 25 is defined between the two pairs of guide rollers 22, 23. An image on the document surface that comes to the scanning position 25 is scanned by the scanner unit 24, which is a photoelectric converter, for example. The scanner unit 24 is substantially made up of a lamp L1 (i.e., a light source), a first reflecting mirror 26, an optical system 27 including a plurality of reflecting mirrors and the like, and a charge-coupled device (CCD) unit 28. The CCD unit 28 is formed by a circuit board 30 on which a CCD 29 is packaged.

Therefore, the document being conveyed through the guide path 19 is irradiated with light at the scanning position 25 by the lamp L1. Light reflecting from the document surface is inputted to the CCD 29, via the first reflecting mirror 26 and the optical system 27. In this embodiment, the circuit board 30, carrying the CCD 29 thereon, is disposed in an upper portion of the apparatus body 2 because this arrangement results in an elevated arrangement of the scanner unit 24 (the CCD unit 28) so that the handling of a document to be scanned becomes easy.

A printing mechanism IK is disposed rearward of the scanner unit 24, within the apparatus body 2. The printing mechanism IK includes ink cartridges containing inks of different colors, that is, cyan (C), magenta (M), yellow (Y) and black (K), and an ink jet head ID for recording a color image on a recording sheet conveyed from the sheet feeder portion 16. The printing mechanism IK is of a so-called serial printing type that records a color image on a recording sheet by a serial method, for example. That is, the printing mechanism IK records a line of a color image on a recording sheet while being moved in a right-to-left direction (i.e., the direction of the width of the apparatus body 2). After the recording of that line of the color image is completed, the document is conveyed by an amount corresponding to one printing line so that the printing mechanism IK can record the next line of the color image.

Figure 3:
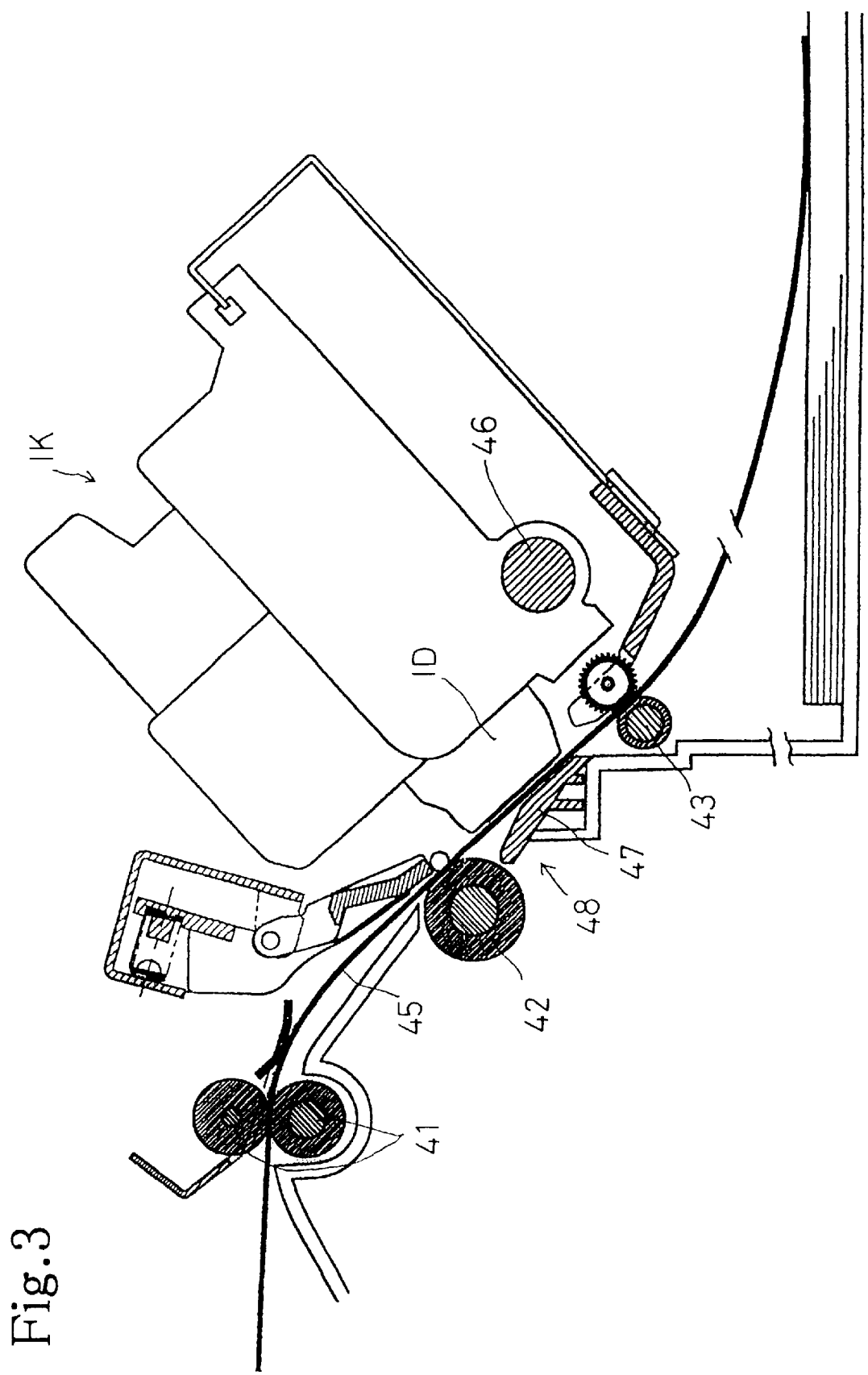
FIG. 3 is a sectional view of portions of the multifunction apparatus shown in FIG. 1.

Recording sheets stacked in the sheet feeder portion 16 are conveyed to the recorded sheet stacker 18, one sheet at a time, through a conveyance path 45 by conveying rollers 41, 42, 43, as shown in FIGS. 2, 3. A platen 47 is mounted, facing the ink jet head ID of the printing mechanism IK and extending along a carriage bar 46. When a recording sheet comes to a printing position 48 defined on the platen 47, printing is performed by the serial printing function of the printing mechanism IK. Color printing is performed when the multifunction apparatus 1 functions as a printer or a copier. Monochrome printing is performed for printout in the facsimile function.

Figure 4:
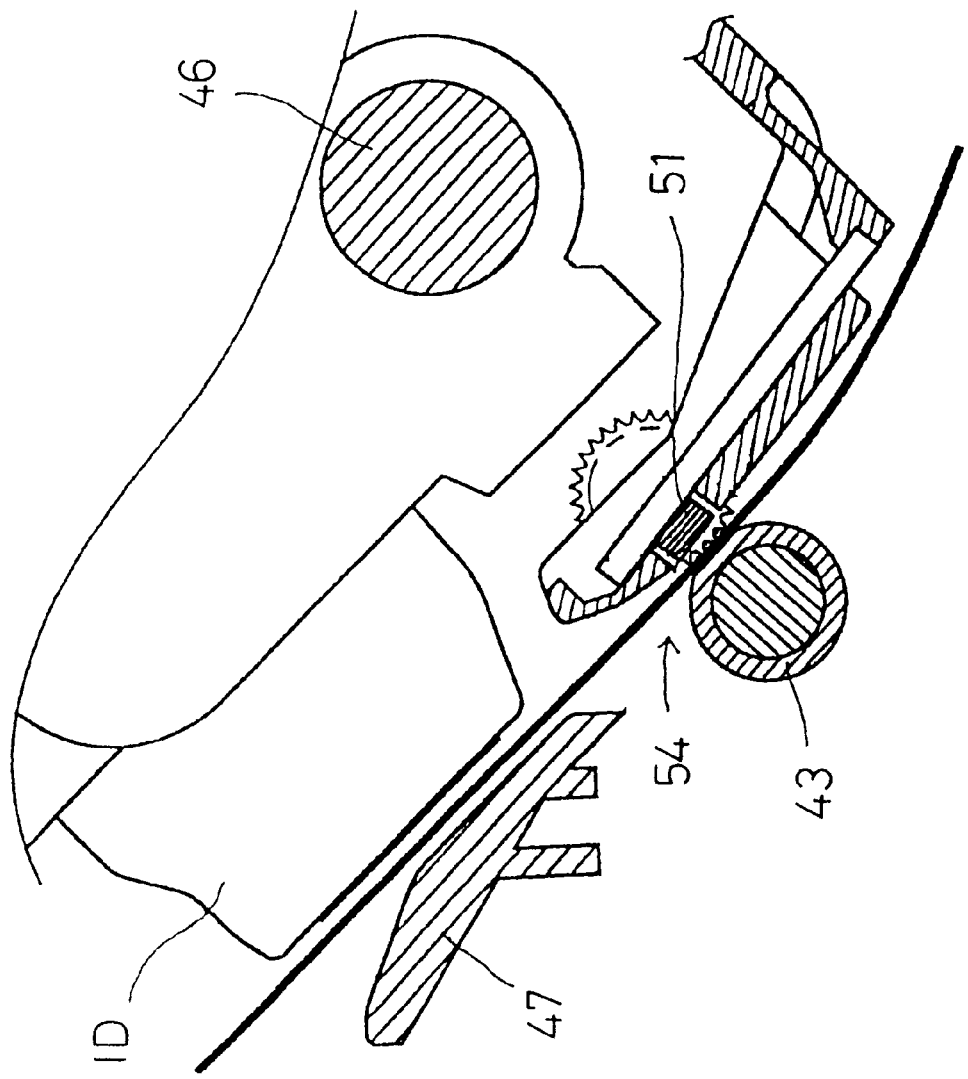
FIG. 4 is a sectional view of portions of the multifunction apparatus shown in FIG. 1.

In this embodiment, a reflection-type sensor 51 is mounted at a position facing the axis of the most downstream conveying roller 43 among the conveying rollers 43, 44, 45, that is, the conveying roller disposed near a document discharge opening 44, as shown in FIGS. 2 and 4. The reflection-type sensor 51 has a light-emitting element (e.g., light-emitting diode), and a light-receiving element. In accordance with the quantity of light reflected from a detection position 54, the reflection sensor 51 acquires data, such as determination data for detection of ink exhaustion using a check mark described below.

Figure 5:
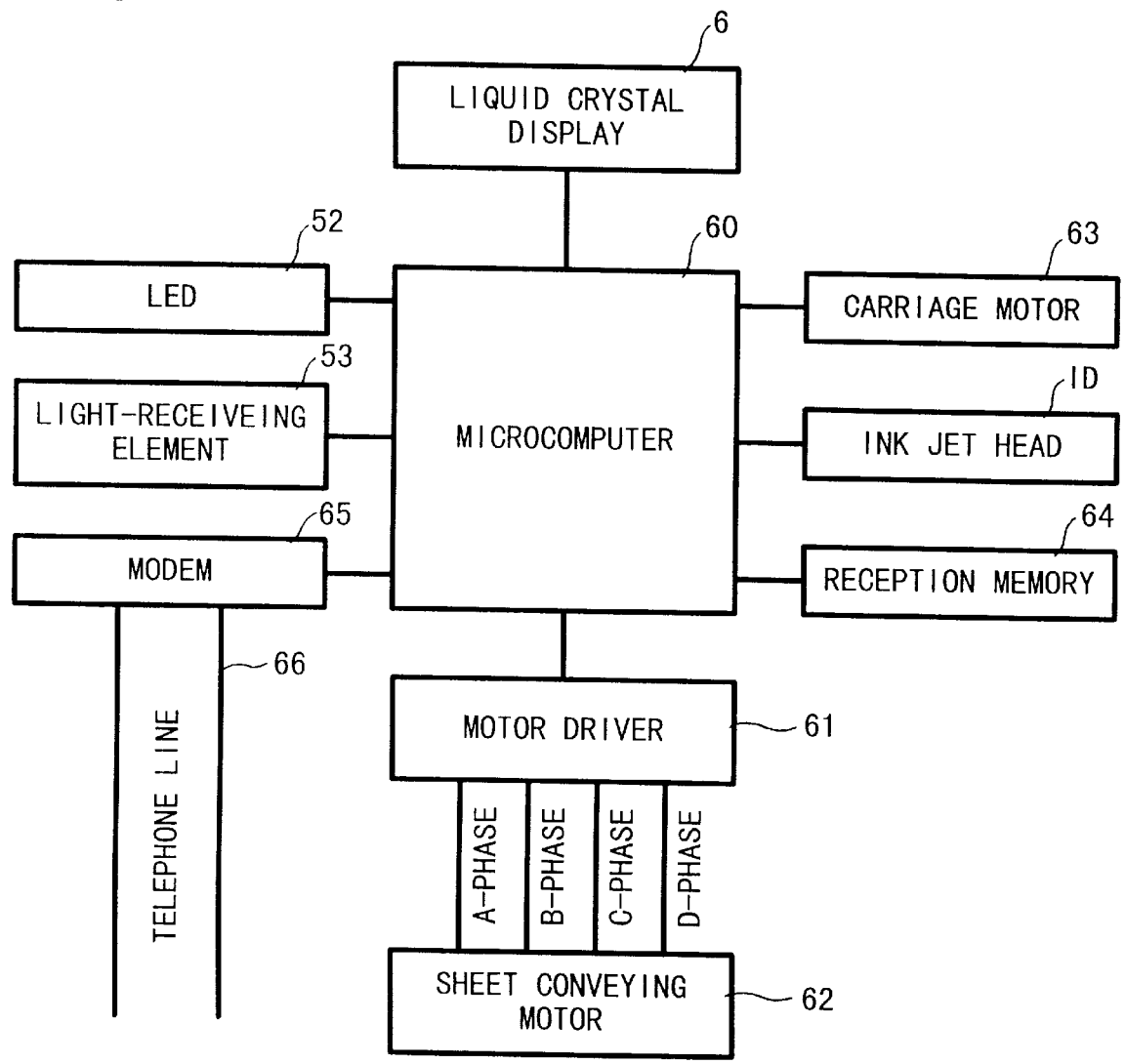
FIG. 5 is a block diagram of a control system of a facsimile function unit of the multifunction apparatus.

Next described will be a control system of the facsimile function unit in the embodiment. As shown in FIG. 5, the control system of the facsimile function unit is made up mainly of a microcomputer 60 having a CPU, a ROM, a RAM, and the like, and the liquid crystal display 6, the ink jet head ID, the reflection sensor 51 having the light-emitting element 52 and the light-receiving element 53, a sheet conveying motor 62, a carriage motor 63, a reception memory 64, a modem 65, a telephone line 66, and the like. The sheet conveying motor 62 is a stepping motor in which one revolution is achieved in 48 steps in a two-two phase excitation mode. In this embodiment, the sheet conveying motor 62 is driven by a motor driver 61 capable of changing the excitation current among three levels, that is, a high level, an intermediate level and a low level. In the motor driver 61, the intermediate level current value is set to 70% (about $\frac{2}{3}$) and the low level current value is set to 33% (about $\frac{1}{3}$), relative to the high level current value (100%).

Figure 6:
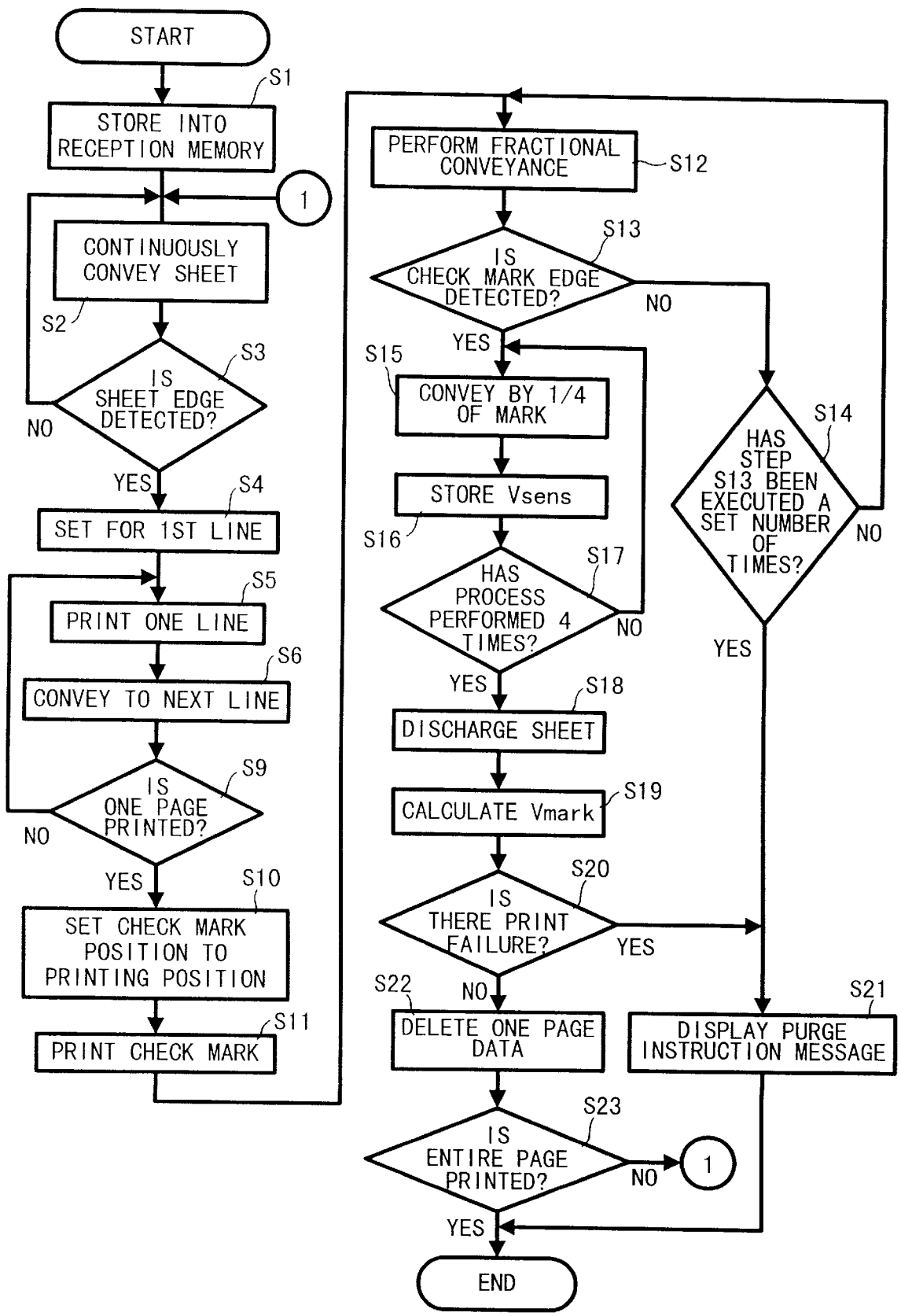
FIG. 6 is a flowchart illustrating an operation procedure of the facsimile function according to the embodiment.
Figure 7:
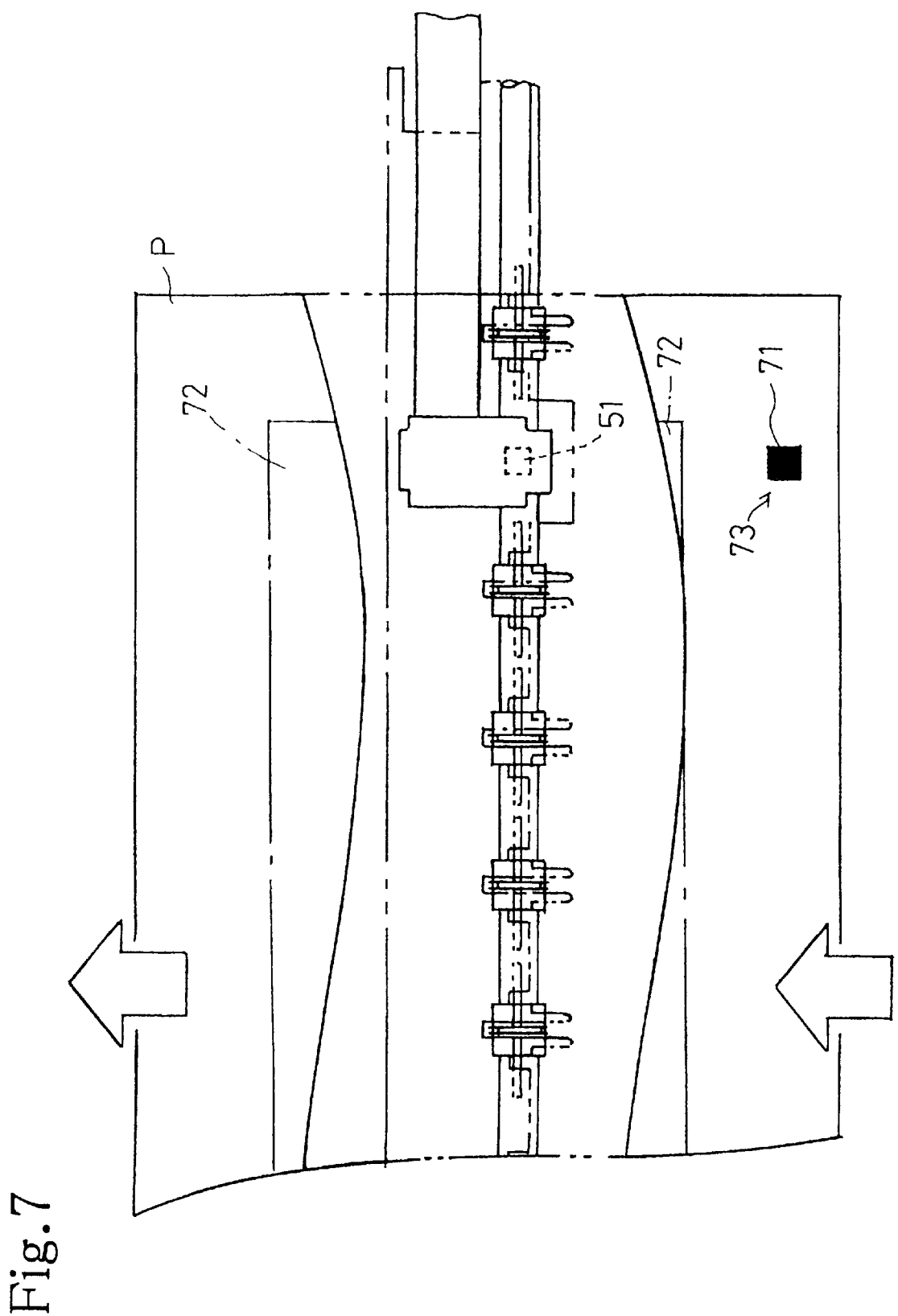
FIG. 7 is a plan view illustrating the printing of a check mark according to the embodiment.

The control performed for facsimile reception will be described with reference to the flowchart of FIG. 6 and the plan view of FIG. 7. When facsimile data arrives via the telephone line 66 and the modem 65, the data is temporarily stored into the reception memory 64 in step S1 as indicated in FIG. 6. After the data is received, the sheet conveying motor 62 is driven in a continuous manner to feed a sheet P in step S2. When the leading edge of the sheet P is detected by the reflection sensor 51 (YES in step S3), the sheet P is further conveyed a predetermined amount and then stopped and set so that the position of the first print line in a print range 72 is positioned at the printing position 48 in step S4.

Then, in step S5, the microcomputer 60 performs the printing of the print line on the sheet P by driving the ink jet head ID and the carriage motor 63 in accordance with the data stored in the reception memory 64. Subsequently in step S6, the sheet P is conveyed an amount corresponding to one print line. In step S9, it is determined whether the print data has been printed out onto the page. Therefore, the printing of one print line in step S5 and the intermittent conveyance of the sheet P in step S6 are repeatedly performed until the print data is printed out onto the page (YES in step S9).

In this embodiment, the intermittent sheet conveyance in the aforementioned process can be performed selectively at a high speed of 600 pps or a low-to-intermediate speed of 380 pps in accordance with the print resolution setting. For the low-to-intermediate speed sheet conveyance by the sheet conveying motor 62, a relatively long excitation period is set such that the motor does not operate out-of-step. That is, the low-to-intermediate speed sheet conveyance is performed by self-start driving of the sheet conveying motor 62 without needing to perform the step-up control. For the high-speed sheet conveyance by the sheet conveying motor 62, the step-up control is performed wherein during a predetermined number of steps following the start of the sheet conveying motor 62, the excitation period for each step is substantially gradually decreased from a relatively long period setting to a period corresponding to a constant conveying speed, and step-down control is performed wherein during a predetermined number of steps before the sheet conveying motor 62 is stopped, the excitation period for each step is substantially gradually increased from the period setting corresponding to the constant conveying speed. These control operations with regard to the sheet conveyance will be described in detail, together with the control operation for the fractional sheet conveyance.

After one page of data is printed out (YES in step S9), the sheet conveying motor 62 is driven and stopped again so that a check mark printing position 73 defined a predetermined distance rearward of the print range 72 on the sheet P comes to the printing position 48 in step S10. Subsequently in step S11, a check mark 71 is printed on the sheet P by driving the ink jet head ID and the carriage motor 63 in accordance with the pre-set check mark print data. The check mark 71 thus printed is a solid square of a predetermined size as shown in FIG. 7.

After the check mark 71 is printed, the fractional conveyance of the sheet P is performed in step S12. Subsequently in step S13, it is checked whether a signal change corresponding to the edge of the check mark 71 has been obtained in the detection signal from the light-receiving element 53. In the fractional sheet conveyance, a control operation of operating the sheet conveying motor 62 for two steps and then stopping it for a detection period is repeated.

If the signal change corresponding to the edge of the check mark 71 is not detected (NO in step S13), it is determined in step S14 whether the fractional conveyance operation has been performed a predetermined number times. If the edge of the check mark 71 is not detected although the fractional conveyance operation has been performed the predetermined number times (NO in step S14), the microcomputer 60 immediately jumps to step S21.

If the edge of the check mark 71 is detected (YES in step S13), the sheet conveying motor 62 is operated a predetermined amount ($\frac{1}{4}$ of the length of the check mark 71) from the point of detection of the check mark 71 by intermittently driving the motor, and the motor is then temporarily stopped in step S15. In step S16, the microcomputer 60 stores a present detected voltage Vsens into the RAM. After the process of steps S15, S16 has been performed four times (YES in step S17), the sheet conveying motor 62 is further driven in the continuous manner to discharge the sheet P onto the recorded sheet stacker 18 in step S18. Subsequently in step S19, the microcomputer 60 determines a detected voltage Vmark with respect to the check mark 71 by calculating a mean value of the four detected voltage values Vsens. In step S20, the microcomputer 60 determines whether there is a print failure due to ink exhaustion or the like, on the basis of the following expressions.

(1) Print failure:

Vmark<threshold (2) Good print:

Vmark≦threshold

In this embodiment, the reflection sensor 51 is designed to output 1 V as a detected voltage Vsens for the white level and 5 V for the black level, and the threshold is pre-set to 0.7×black level. Therefore, if the check mark 71 is blurred due to ink exhaustion, nozzle clogging or the like, expression (1) is established, so that it is determined that a print failure has occurred.

If expression (1) is established, that is, if it is determined that a print failure has occurred (YES in step S20), the microcomputer 60 displays on the liquid crystal display 6 a purge instruction message in step S21, thereby advising a user to purge the ink jet head ID. In this case, the data in the reception memory 64, including the data of the page that has just been printed out, is not erased but retained. Conversely, if it is determined that there is not a print failure (NO in step S20), the received data regarding the printed page is deleted in step S22. Subsequently, the process of steps S2 through S22 is repeated until all of the received data is printed out (YES in step S23).

Next described will be various intermittent sheet conveyance control methods using the sheet conveying motor (stepping motor) 62 according to an embodiment of the invention. First, the high-speed conveyance control method will be described. In the high-speed conveyance control of the sheet conveying motor 62, excitation is performed in the two-two phase excitation mode from the motor start to stop. As indicated in FIG. 8A, the excitation current is changed as follows. During the first step immediately after the sheet conveying motor 62 is started from the stopped state set by the pre-excitation phase, an intermediate level current value is used for the excitation. From the second step until a step immediately before the motor stops, a high level current value is used for the excitation. During the last step immediately before the motor is stopped, a low level current value is used for the excitation. In the chart of FIG. 8A, the heights of the shadowed areas indicate the levels of excitation current (that is, the low, intermediate and high levels).

The high-speed conveyance control according to the embodiment will be compared with a conventional high-speed conveyance control method as indicated in FIG. 8B. In the conventional high-speed conveyance control method, the excitation is performed in the two-two phase excitation mode by high level current from the stepping motor start to stop.

Furthermore, the excitation period setting is also different. That is, the excitation periods in the first to third steps in the embodiment are shorter than the corresponding periods in the conventional method.

Using the control methods as indicated in FIGS. 8A and 8B in an operating apparatus, experiments of high-speed conveyance were conducted and the results are indicated in FIGS. 9A–9D. As can be understood from the process of changes in excitation current indicated in FIGS. 9A and 9B, the sheet conveying motor 62 in the embodiment is a bipolar winding type motor.

Figure 9A:
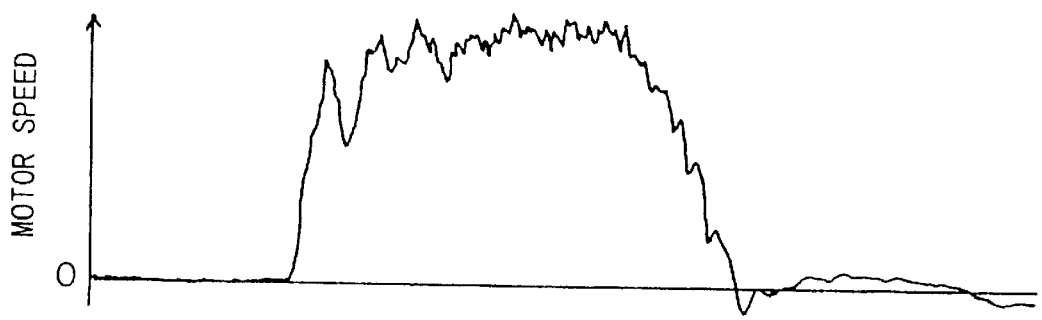
FIGS. 9A and 9B are graphs indicating changes of the motor speed and excitation current in the high-speed sheet conveyance according to the embodiment.
Figure 9B:
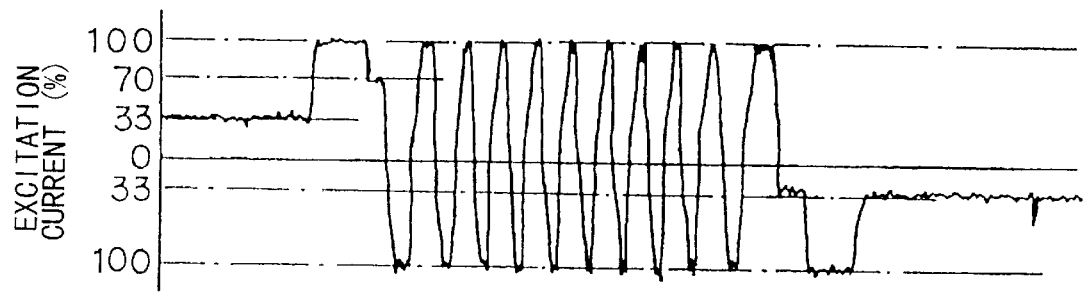
Figure 9C:
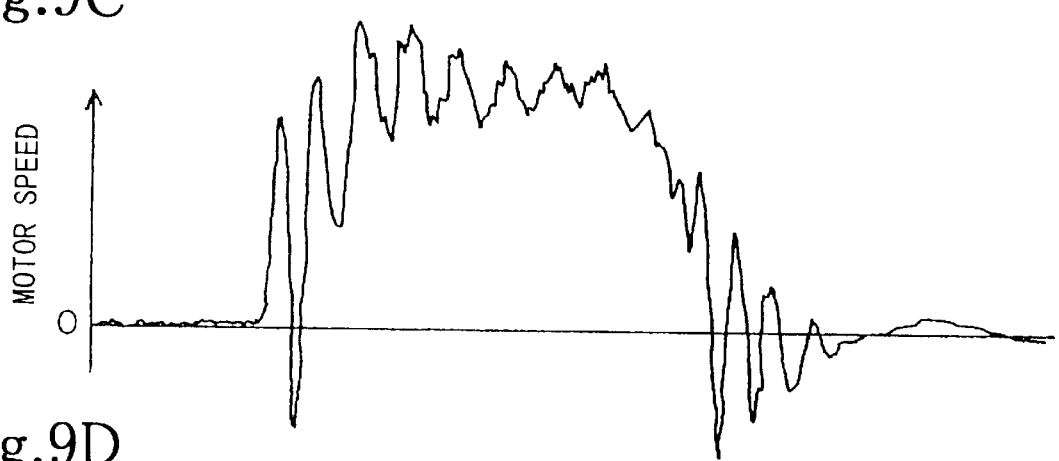
FIGS. 9C and 9D are graphs indicating changes of the motor speed and excitation current in the conventional high-speed sheet conveyance.
Figure 9D:
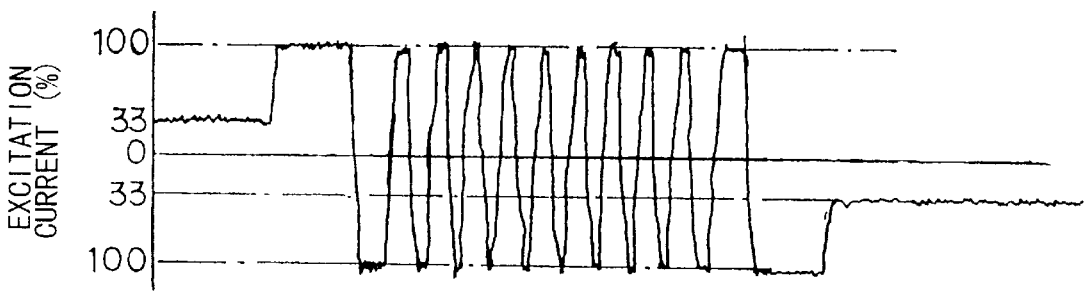

As indicated in FIGS. 9C and 9D, the conventional high-speed conveyance control method causes the motor revolution speed to fluctuate immediately after the motor starts. The motor revolution speed continues to fluctuate even during the constant-speed driving after the step-up control, and fluctuates considerably again immediately before the motor stops. In contrast, through the control method according to the embodiment, the motor revolution speed fluctuation is remarkably reduced throughout the motor's operation from start to stop, as indicated in FIG. 9A.

The motor revolution speed fluctuation is considerably reduced in the embodiment because the excitation current in the first step during the step-up control is set to a value lower than the excitation current in the later steps, that is, about $2/3$ of the excitation current used in the later steps. The thus-reduced starting torque causes the motor to start operating with a smooth revolution. Furthermore, the exiting current in the last step during the step-down control is set to a reduced value, that is, about $1/3$ of the excitation current used in the other steps during the step-down control. Therefore, the thus-reduced driving torque in the last step enables smooth stoppage of the motor.

The noise produced during the intermittent conveyance based on the aforementioned control methods was also measured. Results of an example test indicate that the control method according to the embodiment, wherein the driving current is reduced in the first and last steps as indicated in FIG. 8A, achieves a noise reduction of about 1 to 2 dB, in comparison with the conventional control method as indicated in FIG. 8B. Furthermore, from the experiment results indicated FIGS. 9A–9D, it can be understood that during the high-speed conveyance, the control method according to the embodiment reduces the motor revolution speed fluctuation and therefore reduces the variation of the amount of intermittent sheet conveyance.

The low-to-intermediate speed sheet conveyance control method will be described. In the low-to-intermediate speed conveyance control method according to the embodiment, a one-two phase excitation mode is employed in the first step to occur after the stopped state, and the mode is then switched to the two-two phase excitation mode, and the mode is switched back to the one-two phase excitation mode in a step preceding the motor stop step, as indicated in FIG. 10A. The "step" herein means a step in the two-two phase excitation mode, and corresponds to $1/48$ motor revolution in this embodiment. The value of excitation current is changed by the motor driver 61 during the periods of the one-two phase excitation mode as follows. The value of excitation current is set to the high level at the time of one-phase excitation in the one-two excitation, and it is set to the intermediate level at the time of two-phase excitation. Furthermore, in the embodiment, the period of the step in the one-two phase excitation mode immediately after the motor starts and the period of the step in the one-two phase excitation mode immediately before the motor stops are longer than the period of each step in the two-two phase excitation mode.

The low-to-intermediate speed conveyance control method according to the embodiment will be compared with a conventional low-to-intermediate speed conveyance control method as indicated in FIG. 10B. In the conventional low-to-intermediate speed conveyance control, a stepping motor is driven in the two-two phase excitation mode with regularly cycled excitation periods throughout the motor operation from start to stop.

Furthermore, the excitation period setting is also different. That is, the time period of the $1/48$ revolution immediately after the motor starts and the time period of the $1/48$ revolution immediately before the motor stops in the embodiment are set to periods that are longer than the corresponding periods in the conventional control method. Thus, the motor revolution speed fluctuation is reduced during the period immediately after the motor starts and during the period immediately before the motor stops according to the embodiment.

Figure 11A:
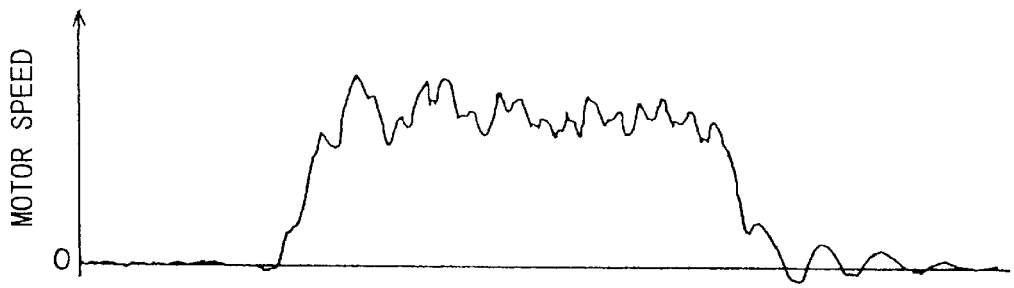
FIGS. 11A and 11B are graphs indicating changes of the motor speed and excitation current in the low-to-intermediate speed sheet conveyance according to the embodiment.
Figure 11B:
Figure 11C:
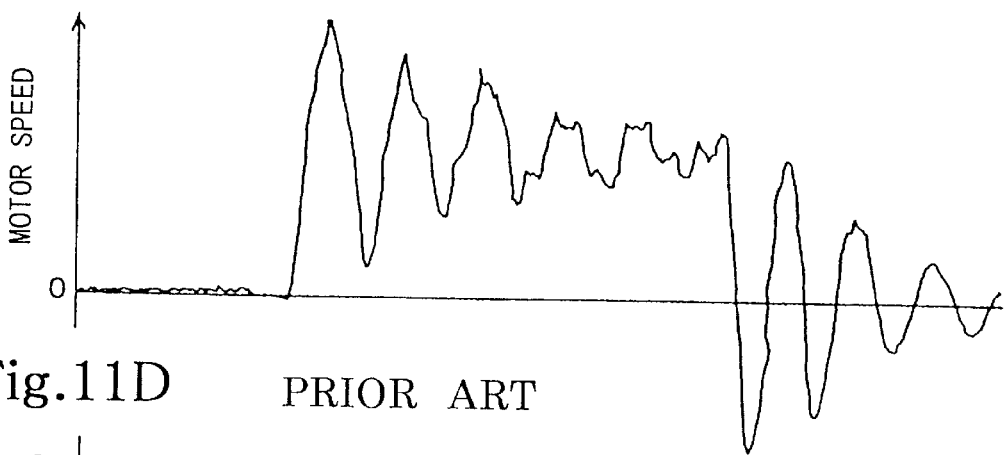
FIGS. 11C and 11D are graphs indicating changes of the motor speed and excitation current in the conventional low-to-intermediate speed sheet conveyance.
Figure 11D:
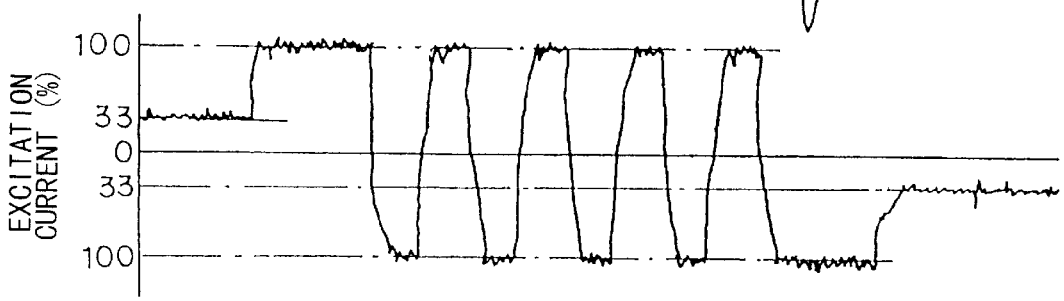

As in the case of high-speed conveyance, experiments of low-to-intermediate speed conveyance were conducted, using the control methods as indicated in FIGS. 10A and 10B in an operating apparatus. Results are indicated in FIGS. 11A–11D. As indicated in FIGS. 11C and 11D, the conventional low-to-intermediate speed conveyance control method in the two-two phase excitation mode causes the motor revolution speed to fluctuate immediately after the motor starts. The motor revolution speed fluctuation does not diminish but continues during a subsequent period. The motor revolution speed then fluctuates considerably again immediately before the motor stops. In contrast, through the control method according to the embodiment, the motor revolution speed fluctuation is remarkably reduced throughout the motor operation from start to stop, as indicated in FIG. 11A.

It is considered that the reason for reduction of the motor revolution speed fluctuation in the embodiment is that the same angular change as the angular change that occurs during the step in the two-two phase excitation mode immediately after the motor starts or immediately before the motor stops in the conventional control method is achieved by the two steps in the one-two phase excitation mode according to the embodiment. Consequently, the rise of the motor revolution speed immediately after start becomes smooth, and the reduction of the motor revolution speed immediate before the motor stops becomes smooth, so that the motor revolution speed fluctuation is reduced. Furthermore, since the excitation current at the time of one-phase excitation is less than the excitation current at the time of two-phase excitation during the one-two phase excitation steps, the driving torque for the first 1/40 revolution is reduced, thereby further reducing the motor revolution speed fluctuation.

In the embodiment, the periods of the one-two phase excitation steps are set to periods that are longer than the period of each two-two phase excitation step. That is, the time period for the angular change of 1/48 revolution immediately after the motor starts is increased, so that the rise of the motor revolution speed becomes smoother. A similar advantage is achieved with regard to the revolution speed reduction during the period immediately before the motor stops.

The noise produced in the apparatus during the low-to-intermediate speed conveyance based on the aforementioned control methods was also measured. Results of an example test indicate that the control method according to the embodiment achieves a noise reduction of about 2 to 3 dB. Furthermore, from the experiment results indicated FIG. 11A, it can be understood that the low-to-intermediate speed conveyance control method according to the embodiment reduces the motor revolution speed fluctuation and, as a result, reduces the variation of the amount of intermittent sheet conveyance, and therefore achieves precise intermittent sheet conveyance.

The fractional conveyance control method will be described. In the fractional conveyance control according to the embodiment, fractional conveyance by 2/48 motor revolution is performed in the one-two phase excitation mode as indicated in FIG. 12A. During the first one-phase excitation period from the stopped state, the excitation current is increased stepwise from the low level to the intermediate level, and then to the high level. During the subsequent two-phase excitation period, the excitation current is increased stepwise from the low level to the intermediate level. During the next one-phase excitation period, the excitation current is increased stepwise from the intermediate level to the high level. During the two-phase excitation period immediately before the motor stops, the excitation current is reduced stepwise from the intermediate level to the low level. As for the excitation period, the excitation period of the low level current during the two-phase excitation period immediately before the motor stops is set to 3.5 msec. The other excitation periods are set to 1.6 msec, so the value of excitation current is changed every 1.6 msec.

The fractional sheet conveyance control method according to the embodiment will be compared with a conventional fractional conveyance control method as illustrated in FIG. 12B. In the conventional fractional conveyance control method, a stepping motor is driven in the two-two phase excitation mode throughout the motor operation from start to stop. Furthermore, the conventional method uses a high-level current in all excitation periods.

The excitation period is also different. That is, in the fractional conveyance control according to the embodiment, each excitation period is 16.3 msec, which is longer than the excitation period in the conventional method, that is, 5.26 msec.

As in the cases of high-speed conveyance and low-to-intermediate speed conveyance, experiments of fractional intermittent conveyance were conducted, using the control methods as indicated in FIGS. 12A and 12B in an operating apparatus. Results are indicated in FIGS. 13A–13D. As indicated in FIGS. 13C and 13D, in the conventional fractional conveyance control method in the two-two phase excitation mode, the motor revolution speed sharply increases immediately after start, and vibration continues even after the motor stops. In contrast, through the control method according to the embodiment, the motor revolution speed fluctuation is remarkably reduced throughout the motor operation from start to stop, as indicated in FIGS. 13A and 13B.

Furthermore, as shown in the right-hand side of the motor speed graphs of FIGS. 9A, 11A, and 13A, as the motor speed decreases, the value of the motor speed is shown to be a negative value for a brief period. These graphs reflect the fact that the motor actually rotates in the opposite direction for a brief time period. However, while the motor rotates in the opposite direction, the sheet conveying roller does not rotate in the opposite direction (i.e. the sheet conveying roller may stop its rotation, however does not change the direction of rotation). This is possible because there is backlash between teeth in the gears located between the sheet conveying roller and the motor to allow the motor to reverse directions without affecting the rotation direction of the sheet conveying roller.

In the fractional conveyance according to the embodiment, the motor revolution angular change immediately after the motor starts is reduced by starting the motor in the one-two phase excitation mode. Furthermore, during the one-phase excitation in the first step immediately after the motor starts, the current is initially set to a low value, and then substantially gradually increased, so that the torque fluctuation immediately after the motor starts is reduced. Therefore, the motor speed change and the torque fluctuation immediately after the motor starts are reduced, so that the vibration, which is a cause of noise, is reduced. Furthermore, the sheet conveying motor 62 is stopped in the one-two phase excitation mode. In addition, during the two-phase excitation period immediately before the motor stops, the excitation current is controlled in such a manner that the current substantially gradually decreases. Therefore, the revolution angle changing rate immediately before the motor stops is reduced and, in addition, the motor torque is substantially gradually reduced before the motor stops, so that the vibration at the time of the motor stops is reduced.

Further, in the embodiment, the angular change in each step throughout the motor operation from start to stop becomes half, in comparison with each step in the two-two phase excitation method. In addition, the torque is substantially gradually increased immediately after the motor starts, and the torque is substantially gradually reduced immediately before the motor stops. Therefore, the vibration at the time of the motor's start and stop is considerably reduced. Furthermore, since the torque is substantially gradually increased during steps other than the steps immediately before the motor starts and immediately before the motor stops, the motor revolution angular change does not become sharp, so that the vibration is also reduced.

Noise produced in the apparatus was measured while the fractional intermittent sheet conveyance was being performed by the control methods according to the embodiment and the conventional art. Measurement results indicate that the fractional conveyance control method according to the embodiment achieves a noise reduction of about 10 dB (A).

As can be understood from the foregoing embodiment, the different stepping motor control methods as described above are employed for the high-speed intermittent sheet conveyance, the low-to-intermediate speed intermittent sheet conveyance and the fractional intermittent sheet conveyance, so that the motor revolution speed fluctuation is considerably reduced in any of the conveyance processes. Therefore, the noise resulting from the vibration during intermittent sheet conveyance is reduced. Furthermore, since the motor revolution speed fluctuation is reduced in the high-speed sheet conveyance and the low-to-intermediate speed sheet conveyance, the precision in stopping the conveying roller 42 and the like is improved.

Figure 14A:
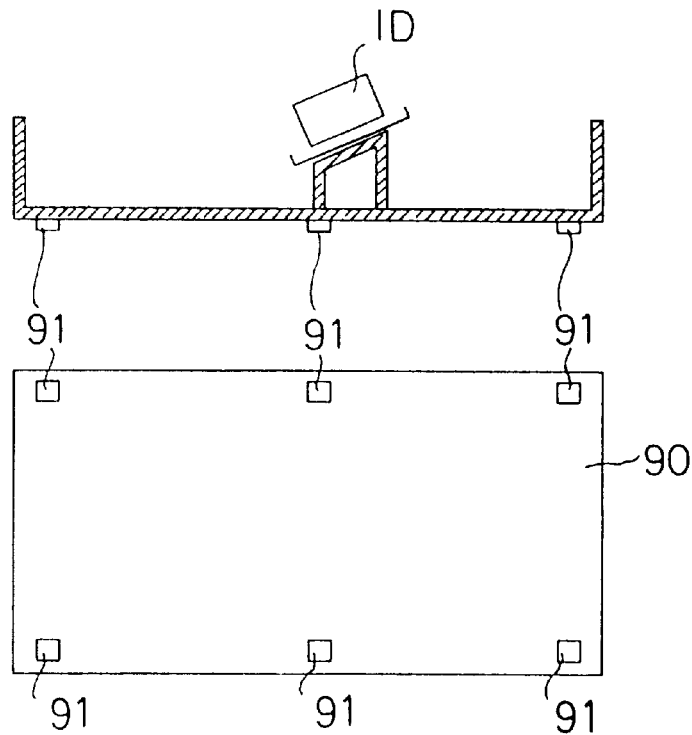
FIG. 14A shows bottom rubber pieces attached to a bottom surface of an apparatus body according to the embodiment.
Figure 14B:
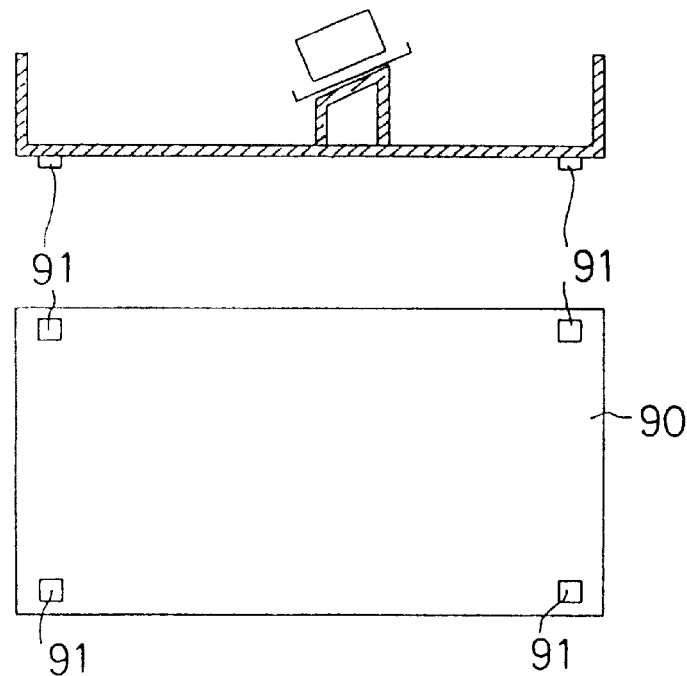
FIG. 14B shows bottom rubber pieces attached to a bottom surface of an apparatus body according to the conventional art.

In the conventional art, rubber pieces 91 are attached only to the four corners of a bottom plate 90 as shown in FIG. 14B. In the embodiment, bottom rubber pieces 91 are attached not only to the four corners of the bottom plate 90 but also to portions at two opposite ends of the bottom plate 90 corresponding to the ink jet head ID. This rubber piece arrangement also reduces the vibration of the apparatus body 2 during printing, thereby achieving further improved print quality. The provision of the bottom rubber pieces 91 at the installed position of the ink jet head ID further reduces the apparatus body 2 during printing, and contributes to prevention of the misaligned print data.

In the foregoing embodiment, the microcomputer 60, performing the drive control of the sheet conveying motor 62 for the high-speed sheet conveyance, constitutes a step-up control device, a constant-speed control device and a step-down control device.

It is to be understood that the invention is not restricted to the particular forms shown in the foregoing embodiment. Various modifications and alternations can be made thereto without departing from the scope of the invention.

What is claimed is:

1. A motor controlling method for driving a stepping motor comprising:
   setting an excitation current in an initial step at a start of the stepping motor to a first current value;
   setting the excitation current in at least one step subsequent to the initial step to a current value that is greater than the first current value;
   changing excitation phases of the stepping motor while gradually reducing an excitation period in a two-two phase excitation mode;
   maintaining the current value that is greater than the first current value until a step preceding a final step immediately before the stepping motor stops and sets the excitation current in the final step immediately before the motor stops, to a second current value that is less than the first current value; and
   changing excitation phases of the stepping motor while gradually increasing the excitation period in the two-two phase excitation mode.

2. The motor controlling method according to claim 1, wherein the excitation phases of the stepping motor are changed in a constant cycle in the two-two phase excitation mode after a period of control.

3. The motor controlling method according to claim 2, further comprising:
   maintaining the current value that is greater than the first current value while the excitation phases of the stepping motor are changed in a constant cycle in the two-two phase excitation mode.

4. The motor controlling method according to claim 3, further comprising:
   intermittently driving the stepping motor in order to intermittently convey a sheet.

5. The motor controlling method according to claim 4, wherein the stepping motor intermittently drives a sheet conveying roller with which the sheet is conveyed in the intermittently driving step.

6. The motor controlling method according to claim 1, further comprising:
   selecting an excitation current value from at least three current values of a high level, an intermediate level and a low level; and
   setting an excitation current in an initial step during the step-up control to the current value of the intermediate level, an excitation current in a final step during the step-down control to the current value of the low level, and an excitation current in each of the steps other than the initial step during the step-up control and the final step during the step-down control to the current value of the high level.

7. The motor controlling method according to claim 6, wherein the current value of the intermediate level is set to about ⅔ of the current value of the high level, and the current value of the low level is set to about ⅓ of the current value of the high level.

8. A motor controlling method for driving a stepping motor, comprising:
   intermittently driving the stepping motor a predetermined number of steps;
   stopping the stepping motor, in a two-two phase excitation mode; and
   controlling the stepping motor in a one-two phase excitation mode, during one step of the predetermined number of steps that occur immediately after a start of the stepping motor and during one step of the predetermined number of steps that is immediately before the stepping motor stops.

9. The motor controlling method according to claim 8, further comprising:
   selecting an excitation current from at least two current values; and
   setting the excitation current during the two-phase excitation in the one-two phase excitation mode less than the excitation current during the one-phase excitation in the one-two phase excitation mode.

10. The motor controlling method according to claim 9, further comprising:
    setting the excitation current during the excitation in the two-two phase excitation mode larger than the excitation current during the two-phase excitation in the one-two phase excitation mode.

11. The motor controlling method according to claim 10, further comprising:

setting the same excitation current during the one-phase excitation in the one-two phase excitation mode as the excitation current during the excitation in the two-two phase excitation mode.

12. The motor controlling method according to claim 8, further comprising:

setting a step period in the one-two phase excitation mode longer than the step period in the two-two phase excitation mode.

13. A motor controlling method for driving a stepping motor comprising:

changing excitation phases of the stepping motor in a one-two phase excitation mode;

setting an excitation current to a relatively low current value; and gradually increasing the current value of the excitation current during a one-phase excitation period immediately after a start of the driving of stepping motor.

14. The motor controlling method according to claim 13, further comprising:

selecting an excitation current from at least three current values of a high level, an intermediate level and a low level;

starting the stepping motor in a one-two phase excitation mode; and selecting current values so that the excitation current is increased stepwise from the low level, to the intermediate level, and then to the high level, during a one-phase excitation period immediately after the stepping motor starts.

15. The motor controlling method according to claim 14, further comprising:

stopping the stepping motor by performing the one-two phase excitation; and selecting current values in the motor driver so that the excitation current is reduced stepwise from the intermediate level to the low level during a two-phase excitation period immediately before the motor operation stops.

16. The motor controlling method according to claim 14, further comprising:

driving the stepping motor in a one-two phase excitation mode from start to stop of the motor.

17. The motor controlling method according to claim 16, further comprising:

gradually reducing the current value of excitation current during a two-phase excitation period immediately before the motor stops.

18. The motor controlling method according to claim 17, further comprising:

initially setting the excitation current to a relatively low current value, and then gradually increased during the other excitation periods.

19. The motor controlling method according to claim 18, further comprising:

setting a maximum current during the two-phase excitation less than a maximum current during the one-phase excitation.

20. The motor controlling method according to claim 19, further comprising:

increasing the excitation current during the one-phase excitation in three steps, from the low level to the intermediate level, then the intermediate level to the high level, or in two steps, from the intermediate level to the high level.

21. The motor controlling method according to claim 20, further comprising:

increasing the excitation current during the two-phase excitation except a two-phase excitation period immediately before the motor stops, in two steps, from the low level to the intermediate level, and reducing excitation current during the two-phase excitation period immediately before the motor stops, in two steps, from the intermediate level to the low level.

22. A motor controlling method for driving a stepping motor comprising:

setting an excitation current in one or more initial steps at a start of the stepping motor to a first current value;

setting the excitation current in at least one step subsequent to the initial steps to a second current value that is greater than the first current value;

maintaining the second current value until a step preceding one or more final steps immediately before the stepping motor stops; and setting the excitation current in the final steps immediately before the motor stops, to a third current value that is less than the second current value.

23. The method according to claim 22, further comprising the step of changing excitation phases of the stepping motor while gradually reducing an excitation period.

24. The method according to claim 22, further comprising the step of changing excitation phases of the stepping motor while gradually increasing the excitation period.

* * * * *